UNITED STATES PATENT OFFICE.

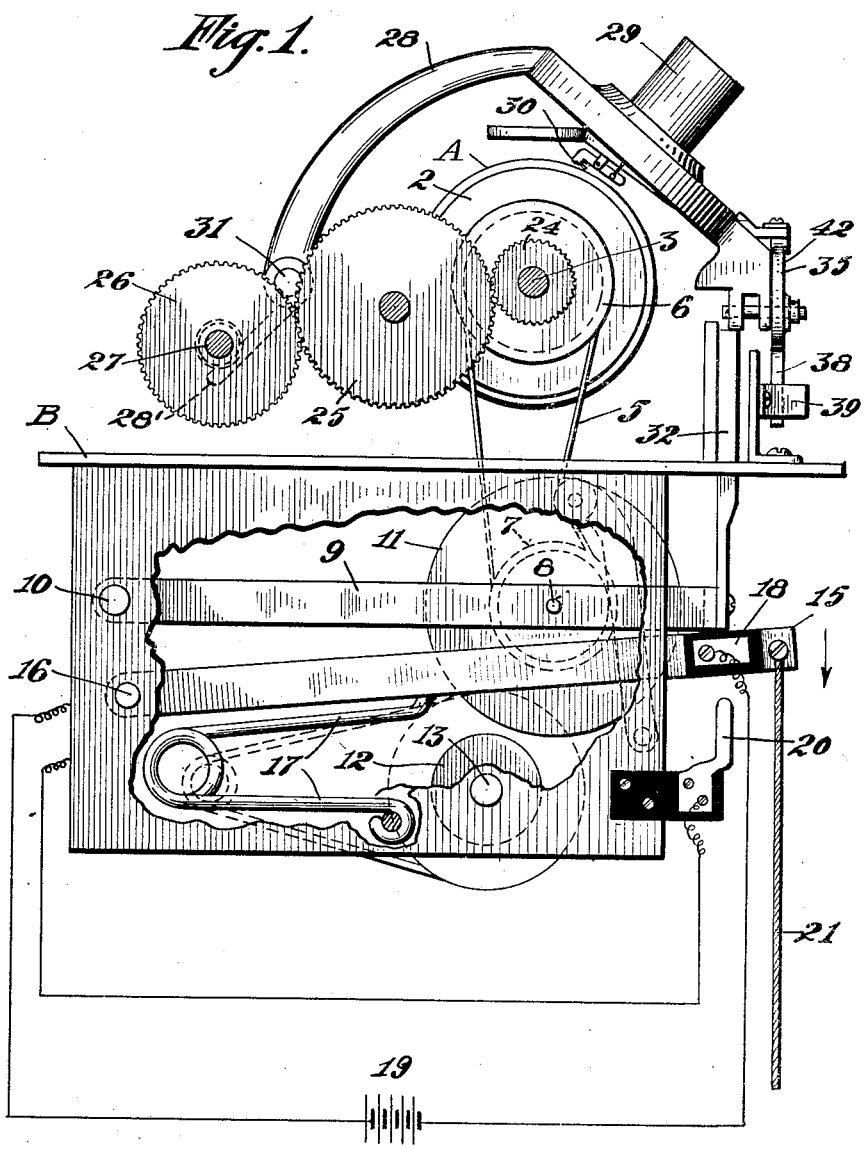

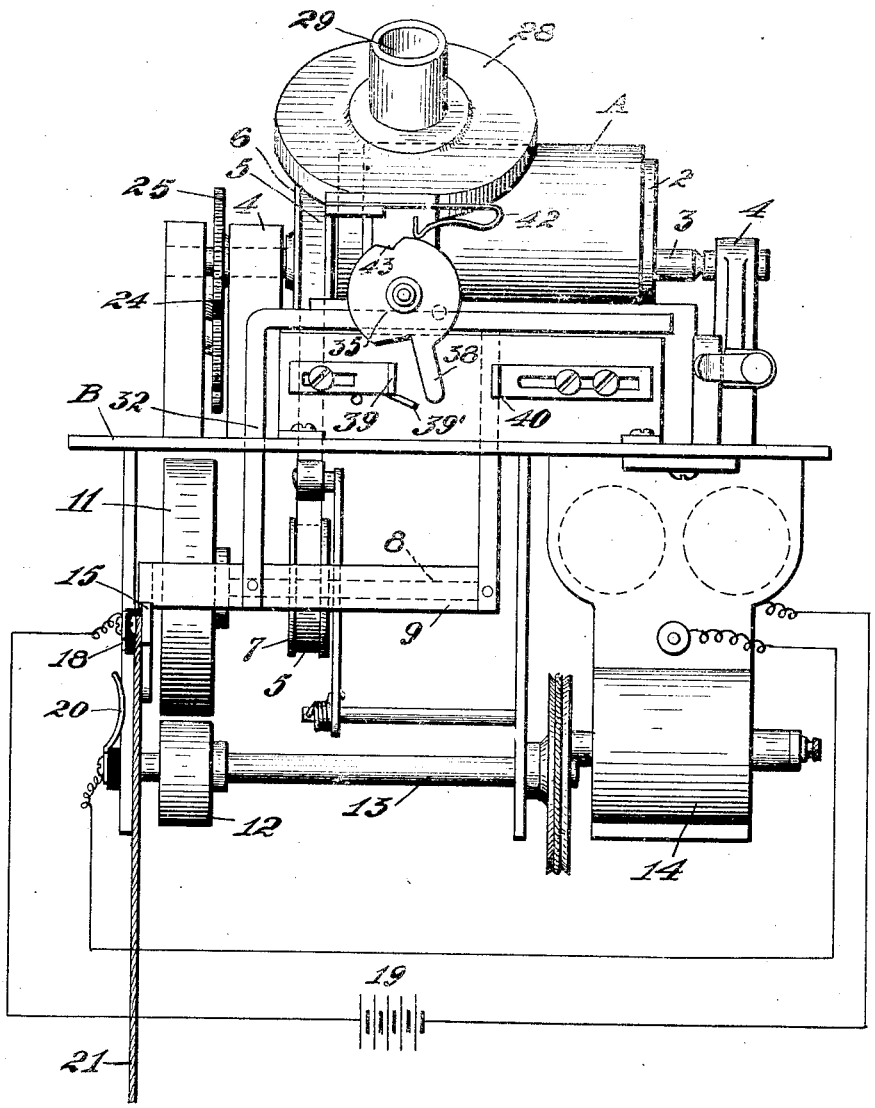

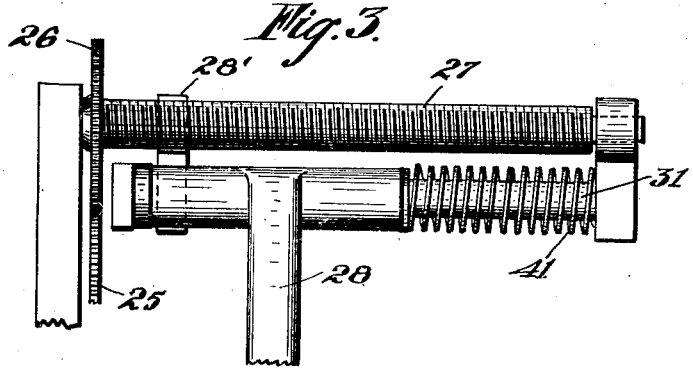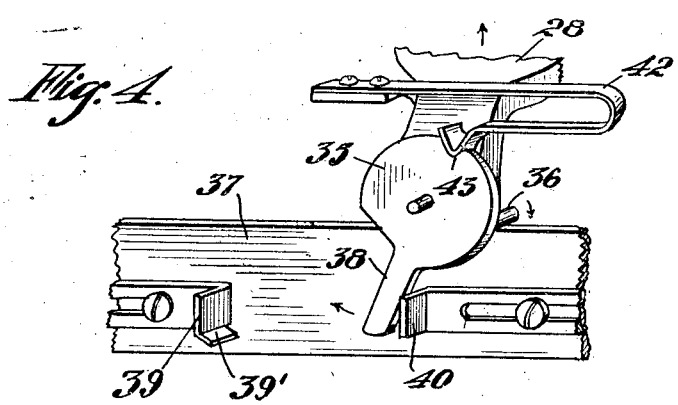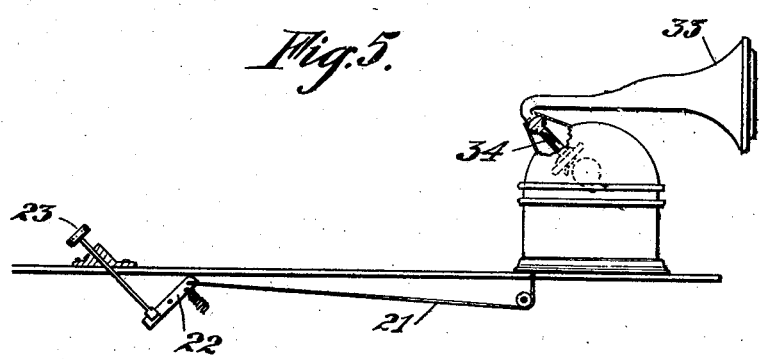

JOSEPH H. ERICKSON, OF SAN FRANCISCO, CALIFORNIA.

PHONOGRAPHIC AUTOMOBILE-ALARM.

1,001,830. Specification of Letters Patent. Patented Aug. 29, 1911.

Application filed October 24, 1910. Serial No. 588,643.

*To all whom it may concern:*

Be it known that I, JOSEPH H. ERICKSON, a citizen of the United States, residing in the city and county of San Francisco and State of California, have invented new and useful Improvements in Phonographic Automobile-Alarms, of which the following is a specification.

This invention relates to a phonographic automobile alarm, and particularly pertains to an automatic repeating attachment for phonographs and the like.

It is the object of this invention to provide an automobile alarm which is operated by a phonograph so as to produce spoken or musical warnings, and to provide automatic means by which the warnings may be controlled and given repeatedly, if desired.

A further object is to provide mechanical means by which quick action of the phonograph will be effected, both at the beginning and at the termination of the alarm, thus insuring the warning being quickly and sharply given and instantly cut off at its completion.

The invention consists of the parts and combination and construction of parts as hereinafter more fully described and claimed, having reference to the accompanying drawings, in which—

Figure 1 is a side view of the invention with parts broken away. Fig. 2 is a front view of the same. Fig. 3 is a plan view of the carriage actuating mechanism. Fig. 4 is a perspective view of the carriage tripping device. Fig. 5 is a view showing the invention as applied.

In the drawings A represents the ordinary cylindrical phonograph record which is mounted to revolve with a drum 2 secured to a shaft 3 supported at each end in suitable bearings 4, mounted on a base plate B, as is common in phonograph construction. The shaft 3 is rotated by means of a belt 5 which passes around a wheel 6 on the shaft 3 and a wheel 7 on a shaft 8 located beneath the plate B and parallel with the shaft 3. The shaft 8 is supported at both ends on a rockable frame 9, pivoted at 10, some distance to the rear of the shaft 8, and is adapted to be rotated by means of a friction drive composed of a friction pulley 11 mounted on the shaft 8 and a similar pulley 12, on a shaft 13. The pulley 11 is adapted to be thrown in and out of contact with the pulley 12 by rocking the frame 9, as later described. The shaft 13 is rotated through a belt drive by means of a small electric motor 14 disposed beneath the plate B; the motor 14 being thrown in and out of operation synchronously with the engaging and disengaging of the friction pulley 11 with the pulley 12. This is accomplished by the following mechanism:—An arm 15 extending beneath the frame 9 and pivoted at 16 contacts the underside of the outer end of the frame and sustains it in its normally uppermost position with the pulley 11 out of contact with the pulley 12; the arm 15 being caused to continually press upward to lift the frame by means of a spring 17, which bears against the underside of the arm 15, as shown in Fig. 1. The outer end of the arm 15 projects beyond the end of the frame 9 and is provided with a contact plate 18 which connects with one pole of a battery 19, the other pole of which connects with one terminal of the motor 14. A knife 20 is disposed beneath the arm 15 in line with the contact plate 18 so as to be thrown into contact with the latter as the outer end of the arm 15 is pulled downward, as later described; the knife 20 being electrically connected with the other terminal of the motor 14. A cord 21 is attached to the outer end of the lever 15 and is intended to be connected to any suitable device or means for exerting a sufficient pull thereon in opposition to the spring 17 to throw the contact plate 18 into contact with the knife 20, and thus complete a circuit from the battery 19 to actuate the motor 14 and at the same time permit the frame 9 to drop downward and cause the pulley 11 to be engaged by the pulley 12 to rotate the drum 2 and record A.

In Fig. 5 the cord 21 is shown as connected to a lever 22 which is adapted to be actuated by means of a push button or tread 23, which may be disposed at any convenient point remote from the mechanism just described.

The shaft 3 carries a pinion 24 on one end which engages with an idle gear 25 which in turn meshes with a gear 26 on a threaded shaft 27, so as to rotate the latter when the shaft 3 is revolved as before described.

A carriage 28 carrying the usual sound box 29 and needle 30 of a phonograph is slidably mounted on a shaft 31 extending parallel with and a little above the threaded shaft 27, an extension 28' on the carriage 28 projecting beneath the shaft 27 and threaded at its point of contact therewith, so that when engaged by the threaded shaft 27 the carriage 28 will be caused to move in one direction across the record A, as is well known in phonographs of this type. Normally the needle 30 is held out of contact with the record cylinder A, and the carriage 28 out of engagement with the threaded shaft 27, by means of a standard 32 mounted on the frame 9, the upper end of which is turned to extend parallel with the record A and to form a support upon which a projection on the outer end of the frame 28 is adapted to rest. From this it will be seen that when the frame 9 is allowed to drop downward by a pull on the cord 21, the needle 30 will be thrown into contact with the record A, so as to vibrate the diaphragm in the sound box 29 and reproduce the sounds originally recorded on the cylinder A; the carriage 28 carrying the needle 30 and sound box 29 being moved along by the threaded shaft 27, which normally engages the carriage when the needle 30 contacts the record A.

By attaching the mouthpiece of the sound box 29 to an automobile horn 33 by a flexible tube 34, as shown in Fig. 5, and mounting the whole device upon an automobile an effective alarm or warning is obtained, which may be operated at will by pressing upon the button 23. The exact expression of warning to be given may be anything suitable which may be produced by phonographic record, such as for instance, "Get out of the way," a bugle call or the like.

As it may be desired to give continuous alarms and constantly repeat the warnings, means are provided for automatically returning the carriage 18 instantly to its normal position as soon as it has passed the length of the record A, so as to repeat the alarm as long as the arm 15 and frame 9 are pulled down. This is accomplished by mounting a disk 35 on the front end of the carriage 28 in front of the standard 32, a pin 36 on the back of the disk projecting above a vertically disposed plate 37 on the base plate B; and having a finger 38 extending downward between two adjustable stops 39—40, as shown in Figs. 2 and 4. When the outer end of the carriage 28 is in its lowermost position with the needle 30 in contact with the record A and the projection 28' engaged by the threaded shaft 27, the pin 36 will contact the plate 37 so that when the finger 38 comes in contact with the stop 40 as the carriage 28 moves forward, the disk 35 will be rocked on its bearing with the pin 36 acting as a cam on the plate 37 to raise the outer end of the carriage 28 and release the threaded projection 28' from the shaft 27 whereupon a spring 41 on the shaft 31 will return the carriage 28 to its starting position. A spring 42 engages a notch 43 on the disk 35 to retain it in the position set by the stop 40 until the carriage 28 has completed its return, whereupon a lip 39' on the stop 39 is encountered by the finger 38 which acts to restore the disk 35 to its normal position and allows the front end of the carriage 28 to drop down as before, to be again carried across the record A.

The operation of the invention is apparent from the foregoing description; it being readily seen that when it is desired to give a phonographic alarm, a pull on the string 21 will allow the carriage 28 to gravitate downward to throw the needle 30 into operative engagement with the record A, and at the same time start the motor 14 which revolves the record A and moves the carriage 28 forward as before described, and that as long as the arm 15 is down by virtue of the pull on the string 21 the motor 14 will continue to act and the carriage will repeatedly travel back and forth across the record by means of threaded shaft 27, the trip disk 35 and its co-acting parts and the spring 41; and that as soon as the pull on the string 21 is released the carriage 28 will be lifted up by the standard 32 and returned to its normal position by the spring 41.

Having thus described my invention, what I claim and desire to secure by Letters Patent is—

1. A phonographic automobile alarm comprising a revoluble record, a sound box and stylus and amplifying horn, controllable means to mechanically engage and disengage the stylus and record, said means comprising a movable support for normally maintaining the stylus out of engagement with the record, a spring pressed member engaging the said support and holding it in an elevated position, and means for moving said member to allow the stylus to engage the record, a driving element, and a transmitting mechanism between said element and the record, and movable into engagement with the driving element substantially simultaneously with the engagement of the stylus with the record.

2. A phonographic automobile alarm comprising a revoluble record, a sound box and stylus and amplifying horn, controllable means to mechanically engage and disengage the stylus and record, said means comprising a movable support for normally maintaining the stylus out of engagement with the record, a spring pressed member engaging the said support and holding it in an elevated position, and means for moving said member to allow the stylus to engage the record, a driving element, and a transmitting mechanism between said element and the record, and movable into engagement with the driving element substantially simultaneously with the engagement of the stylus with the record, and means to automatically return the record and repeat the signal.

3. A phonographic automobile alarm, consisting of a revoluble record, a sound box and stylus, and amplifying horn, a motor, a pivoted frame for normally holding the stylus out of engagement with the record, a spring pressed arm engaging the frame and normally holding the same in an elevated position, a motor, means for retracting the arm to allow the frame to drop so that the stylus may engage the record, electrical connections for energizing the motor substantially simultaneously with the engagement of the stylus with the record, and driving connections between the motor and the record, one of said connections being carried by said arm.

4. In apparatus of the character described, the combination with a revoluble record, a sound box and stylus, and an amplifying horn, of means for holding the stylus normally out of engagement with the record, a motor, means interposed between the stylus and the motor for normally supporting the first named means, connections between the motor and the second named means by which the motor is started substantially simultaneously with the release of the stylus supporting means and the engagement of the stylus with the record, and driving connections between the motor and the record, one of said connections being carried by the stylus supporting means.

5. The combination with a phonographic record, sound box, stylus and amplifying horn of a motor and a friction drum driven by said motor, a companion drum, a hinged lever upon which said drum is journaled, pulley and belt connections between said drum and the revoluble record, means by which the record friction drum is normally held out of contact with its driver, and means by which the drums are brought into contact and the motor energized in unison.

6. The combination of a phonographic record, sound box, stylus and amplifying horn, of a motor, a frictional drum driven thereby, a second drum, a hinged lever upon which said second drum is journaled, belt and pulley connections between said second drum and the record, a spring actuated lever whereby the first named lever and its frictional drum are normally maintained out of contact with the motor driven drum, a switch located in the motor circuit, said switch having a fixed member and a member movable with the spring lever, and connections whereby said lever may be depressed to close the switch and energize the motor and to allow the frictional drum to drop into contact so as to impel the revoluble record.

7. In a phonograph having a revoluble phonographic record, a stylus and a reciprocal stylus carrying carriage adapted to gravitate into operative contact with the record, a spring actuated support for normally holding the stylus out of contact with the record, means for depressing the spring, yieldable means for normally retaining the stylus in the starting position while the latter is out of contact with the record, automatic means for lifting the stylus out of contact with the record to allow said yieldable means to instantly return the carriage and stylus to the starting position while the aforesaid yieldable means is compressed to cause a repetition of the travel of the stylus along the record, said last named means comprising a disk pivoted to the carriage, a pin on the disk eccentric to the pivotal point thereof, and means for rocking said disk to cause said pin to bear against said support to lift the carriage.

8. The combination in a phonograph having a revoluble record, a carriage reciprocal above the record and a stylus on the carriage adapted to contact the record, a spring for holding the carriage and stylus free from the record, means for depressing said spring from a distance to allow the stylus to engage the record, means for rotating the record, threaded means for moving the stylus carriage in one direction across the record while the stylus is in contact therewith, yieldable means for instantly returning the stylus carriage the moment the stylus is lifted from the record, and means for automatically lifting the stylus from the record at a predetermined point in the forward movement of the carriage, said last named means consisting of a trip member pivoted on the carriage, a fixed support, a pin on the trip member adapted to be caused to bear against the fixed support to lift the trip member and the carriage therewith, an adjustable stop to actuate the trip member on its forward movement to cause it to lift and support the carriage, a detent for holding the trip member fixed while the carriage moves back and an adjustable stop for again actuating the trip at the end of the return movement to release the detent and allow the stylus to again drop back upon the record to repeat the forward movement.

In testimony whereof I have hereunto set my hand in the presence of two subscribing witnesses.

JOSEPH H. ERICKSON.

Witnesses:
  JOHN H. HERRING,
  WM. C. UNDERHILL.

---

Copies of this patent may be obtained for five cents each, by addressing the "Commissioner of Patents, Washington, D. C."